(12) United States Patent
Larson et al.

(10) Patent No.: US 8,496,786 B2
(45) Date of Patent: Jul. 30, 2013

(54) HEAVY FEED MIXER

(75) Inventors: William Arthur Larson, Houston, TX (US); George E. Dabney, Jr., Richmond, TX (US); John R. Murphey, III, Pearland, TX (US); Kenneth Jack Fewel, Jr., Houston, TX (US); Yong Wang, Katy, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 823 days.

(21) Appl. No.: 12/638,078

(22) Filed: Dec. 15, 2009

(65) Prior Publication Data
US 2011/0144405 A1  Jun. 16, 2011

(51) Int. Cl.
*C10G 9/18* (2006.01)
(52) U.S. Cl.
USPC ............................................................ 196/110
(58) Field of Classification Search
USPC ............................................................ 196/110
See application file for complete search history.

(56) References Cited

U.S. PATENT DOCUMENTS

| | | | |
|---|---|---|---|
| 3,617,493 A | 11/1971 | Wirth et al. |
| 4,498,629 A | 2/1985 | Grondman |
| 4,602,731 A | 7/1986 | Dockus |
| 4,673,486 A | 6/1987 | Orihashi |
| 4,723,862 A | 2/1988 | Ito et al. |
| 5,013,612 A | 5/1991 | Hunt et al. |
| 5,042,847 A | 8/1991 | Lasecki et al. |
| 5,190,634 A | 3/1993 | Fernandez-Baujin et al. |
| 5,580,443 A | 12/1996 | Yoshida |
| 5,817,226 A | 10/1998 | Lenglet |
| 6,228,253 B1 | 5/2001 | Gandman |
| 6,632,351 B1 | 10/2003 | Ngan et al. |
| 6,797,238 B2 | 9/2004 | Chandrasekharan et al. |
| 7,090,765 B2 | 8/2006 | Spicer |
| 7,247,765 B2 | 7/2007 | Stell |
| 7,297,833 B2 | 11/2007 | Beattie |
| 7,311,746 B2 | 12/2007 | Stell et al. |
| 7,312,371 B2 | 12/2007 | Stell |
| 7,351,872 B2 | 4/2008 | Stell |
| 7,358,413 B2 | 4/2008 | Stell |

(Continued)

OTHER PUBLICATIONS

PCT International Search Report dated Oct. 22, 2010 corresponding to International Application No. PCT/US2010/047691 filed Sep. 2, 2010.
PCT Notification of Transmittal of the International Search Report and the Written Opinion of the International Searching Authority, or the Declaration dated Feb. 11, 2011 corresponding to International Application No. PCT/US2010/060279 filed Dec. 15, 2009.

(Continued)

*Primary Examiner* — Randy Boyer
(74) *Attorney, Agent, or Firm* — Locke Lord LLP; Alan B. Clement; Peter J. Fallon

(57) ABSTRACT

An apparatus designed to completely vaporize an intake of heavy hydrocarbon feedstock is described. The apparatus, a so-called heavy feed mixer, is comprised of pipes being disposed coaxially about a common longitudinal axis. The inner tubular section delivers a two-phase liquid-vapor mixture of hydrocarbon feedstock and dilution steam to the apparatus. The converging/diverging tubular section has a unique structure which converges to a throat section and then diverges to an outlet section. The converging section directs a uniform shroud of superheated steam onto the hydrocarbon stream delivered by the inner tubular section. Impingement of the superheated steam with the intake stream initiates mixing and further vaporization within the throat section. The mixture traverses the converging/diverging tubular section and passes into the outlet section where vaporization is complete. The completely vaporized stream is directed out of the apparatus for further processing downstream.

9 Claims, 4 Drawing Sheets

U.S. PATENT DOCUMENTS

| | | |
|---|---|---|
| 2004/0147794 A1 | 7/2004 | Brown et al. |
| 2005/0014986 A1* | 1/2005 | Chandrasekharan et al. 585/648 |
| 2006/0248800 A1 | 11/2006 | Miglin et al. |
| 2007/0232845 A1 | 10/2007 | Baumgartner |
| 2008/0131723 A1 | 6/2008 | Tucker et al. |
| 2008/0251419 A1 | 10/2008 | Stein et al. |

OTHER PUBLICATIONS

PCT Notification Concerning Transmittal of International Preliminary Report on Patentability (Chapter I of the Patent Cooperation Treaty) (PCT Rule 44bis.1(c)) dated Jun. 28, 2012.

* cited by examiner

HEAVY FEED MIXER

BACKGROUND OF THE INVENTION

I. Field of the Invention

This invention relates generally to an apparatus and process for vaporizing heavy hydrocarbon feedstock. In particular, the present invention relates to an apparatus and process for substantially completely vaporizing heavy hydrocarbon feedstock mixed with steam. The invention also relates to the use of the apparatus and process in the production of gaseous and liquid products such as olefins from heavy hydrocarbon feedstock.

II. Background of the Related Art

Thermal cracking to convert hydrocarbon feedstocks into more useful gaseous and liquid by-products is a well known process. The cracking process, which is also known as pyrolysis, cracks the carbon-carbon bonds in longer hydrocarbons to form smaller chain hydrocarbons. The overall reaction rate and end products are dependent on the processing temperature, pressure and residence time. Thermal cracking has commonly been used to produce olefins such as ethylene, propylene or butene from various types of relatively light hydrocarbon feedstocks, such as ethane, propane or naphtha. Steam cracking is a high-temperature thermal cracking process, which is typically performed in a pyrolysis furnace.

A conventional pyrolysis furnace generally has two primary sections: a convection section and a radiant section. Gaseous or liquid hydrocarbon feed is introduced into the convection section where it comes into indirect contact with and is preheated by furnace burner exhaust gases. Additionally, where desired, dilution steam may be added in the convection section. The liquid hydrocarbon feed is preheated in the convection section to produce a liquid-vapor two-phase mixture. The preheated feed is then directed to a radiant section, wherein the feedstock-steam mixture is heated with radiant heat and typically cracked at temperatures as high as 850° C. for residence times measured in tenths of a second to form the desired products. After cracking, the cracked gas exits the furnace, preferably is quickly quenched, and is sent for further processing downstream. The products formed as a result of the cracking process depend on factors such as the composition of the feed, the hydrocarbon-to-steam ratio, as well as the cracking temperature, pressure and furnace residence time.

Steam cracking in a pyrolysis furnace has been used to successfully produce olefins from light hydrocarbon feedstocks such as ethane, propane, liquefied petroleum gas (LPG), or naphtha. There is, however, a continuing need to reduce the costs associated with the production of olefins. One approach involves the use of lower-cost feedstocks, which can be economically upgraded by pyrolytic cracking processes. For example, the use of feedstocks heavier than the ethane or naphtha feedstocks, which have been the predominant feeds, can possibly reduce the cost of olefin production. Examples of heavy hydrocarbon feedstocks, which may be considered include, but are not limited to, atmospheric gas oil, vacuum gas oil, crude oil, deasphalted oil, oils derived from tar sands or oil shale, gas to liquid heavy ends, heavy condensate and hydrocracked residue. However, the use of these heavier feedstocks having an initial boiling point above 200° C. in a pyrolysis furnace can result in fouling or coking in the convection section tubes, which adversely affects the operation and performance of the furnace. This occurs when the non-vaporized heavy ends are exposed to the high temperatures in the metal tubing within the convection section. It becomes necessary to halt production and clean the pyrolysis furnace at periodic intervals. This significantly reduces output and increases production costs. To reduce this problem, the heavy hydrocarbon feedstock must be completely vaporized in the presence of steam within an unheated surface.

A variety of approaches have been employed in attempting to address the above and other issues associated with the pyrolytic cracking of heavy hydrocarbon feedstock. For example, U.S. Pat. No. 6,632,351 to Ngan, et al. and U.S. Pat. No. 7,311,746 to Stell, et al., which are incorporated by reference as if fully set forth in this specification, each disclose an apparatus for pyrolyzing heavy feedstock, which separates the volatile and non-volatile components of the heavy feed. The light hydrocarbon components, which cause less coking problems, are fed to a steam cracking furnace where they may be converted to olefins. The heavy hydrocarbon components are routed to, for example, a storage tank where they may be processed using other techniques, such as fluid catalytic cracking. However, these approaches require extra processing steps as well as the addition of one or more mixing and separation units prior to the convection section. This significantly increases the process complexity and results in high capital costs.

Another example is provided by U.S. Pat. No. 5,190,634 to Fernandez-Baujin, et al. and U.S. Pat. No. 5,817,226 to Eric Lenglet, which are incorporated by reference as if fully set forth in this specification. Disclosed in these patents are processes in which coke formation is inhibited by using hydrogen-rich gas streams such as $H_2$, $CH_4$ or vaporized light hydrocarbon feedstock to mix and vaporize heavy carbon feedstock. The inclusion of hydrogen products in the convection section minimizes coke formation by, for example, inhibiting polymerization of the preheated hydrocarbons. However, these approaches require additional piping to deliver the requisite hydrogen-rich stream thereby increasing the complexity and cost. The need to use process gases such as $H_2$ also adds to the overall operating costs.

Still another example may be found in U.S. Pat. No. 4,498,629 to Alexander Grondman and U.S. Pat. No. 6,797,238 to Chandrasekharan, et al., which are incorporated by reference as if fully set forth in this specification. These patents disclose an apparatus that minimizes the propensity for coke formation by completely vaporizing the heavy hydrocarbon feedstock with steam prior to being fed to the radiant heating section of the furnace. The apparatus comprises two concentric tubular elements having coinciding longitudinal axes and an annular spaced formed between them. The outer tubular element has a slightly diverging and elongated frusto-conically shaped element attached to its open end at a position, which is behind the location where superheated steam meets the heavy hydrocarbon feedstock. This configuration is stated to reduce the amount of liquid droplets contacting the wall of the frusto-conically shaped element, thereby reducing the risk of coke formation. However, the apparatus requires a very long vaporization length in order to substantially completely vaporize the hydrocarbon feedstock. This adds to the capital cost and requires valuable plot space in the furnace convection section.

Additional methods and systems for cracking heavy hydrocarbon feedstock are disclosed, for example, in U.S. Pat. Nos. 3,617,493; 4,673,486; 5,580,443; 7,090,765; 7,247,765; 7,297,833; 7,312,371; 7,351,872; and 7,358,413 as well as U.S. Patent Appl. Publ. No. 2007/0232845. Each of the aforementioned is incorporated by reference as if fully set forth in this specification. The above prior art approaches disclose various methods and systems that are capable of producing lighter hydrocarbon products from heavy hydrocarbon feedstock with varying degrees of efficiency and of reducing some of the problems associated with coking or fouling. However, there is a continuing need for still further improvements in design and efficiency along with reductions in cost.

SUMMARY OF THE INVENTION

According to one specific embodiment of the present invention an apparatus for the vaporization of a hydrocarbon feed mixture with steam is provided, said apparatus comprises an outer relatively elongated shell comprising a downstream outlet, an outlet section, a converging/diverging tubular section, an upstream inlet section and an upstream inlet, (a) said upstream inlet section comprising in fluid communication:
  (i) a frusto-conical inlet section for directing a hydrocarbon feedstock and dilution steam mixture received from the upstream inlet to an inner tubular pipe section, and
  (ii) said inner tubular pipe section for the passage of said hydrocarbon feedstock and dilution steam mixture from said frusto-conical inlet section through a plate separating the frusto-conical inlet section from the converging/diverging tubular section, said upstream inlet and said upstream inlet section are located at an upstream end of said apparatus;
(b) said converging/diverging tubular section comprising
  (i) an opening section, a converging section, a throat section, and a diverging section, the walls of said diverging section extending to connect to said elongated shell,
  (ii) at least one steam inlet for receiving steam from an opening disposed along said elongated shell into an outer annular region defined by said plate on the upstream end, said elongated shell, and said diverging section on the downstream end,
  (iii) wherein said opening section forms an inner annular region around said inner tubular pipe section for receiving steam from said outer annular region and said hydrocarbon feedstock and dilution steam mixture from said inner tubular pipe section and discharges the mixture into the converging section,
  (iv) wherein said throat section receives the effluent from the converging section, and
  (v) wherein said diverging section receives the effluent from the throat section; and
(c) said outlet section in fluid communication with the diverging section of said converging/diverging tubular section, said outlet section is in fluid communication with said downstream outlet at a downstream end of the apparatus.

According to another specific embodiment of the invention, an apparatus for vaporizing hydrocarbon feedstock is provided. The apparatus comprises an upstream inlet in fluid communication with an upstream inlet section comprising a frusto-conical inlet section and an inner tubular pipe section; an outlet section in fluid communication with a downstream outlet; and a converging/diverging tubular section having an upstream end integral with said frusto-conical inlet section and comprising:
  i) an opening section,
  ii) a converging section whose diameter gradually decreases from that of the opening section,
  iii) a throat section, having a constant diameter, and
  iv) a diverging section whose diameter gradually increases from a diameter of the throat section to a diameter of the outlet section, wherein said diverging section is in fluid communication with said outlet section, wherein the upstream inlet section and the opening section of the converging/diverging tubular section are disposed coaxially about a common longitudinal axis, wherein at least a portion of the downstream end of the inner tubular pipe section is enclosed by the upstream end of the opening section of the converging/diverging tubular section, and wherein a downstream end of the diverging section is integral with the outlet section.

In yet another specific embodiment of the invention, a process for vaporizing a heavy hydrocarbon feedstock is provided. The process comprises:
  i) mixing a preheated hydrocarbon feed with dilution steam to partially vaporize the hydrocarbon feed to form a liquid-vapor two-phase mixture;
  ii) directing said liquid-vapor two-phase mixture to an upstream inlet in fluid communication with an upstream inlet section containing a frusto-conical inlet section in fluid connection with an inner tubular pipe section for the passage of said liquid-vapor two-phase mixture to a converging/diverging tubular section having an opening section, a converging section for mixing the hydrocarbon feed mixture in fluid communication with a throat section, wherein the liquid-vapor two-phase mixture is discharged from the throat section by way of a diverging section in fluid communication with an outlet section having a downstream outlet, said upstream inlet section, converging/diverging tubular section and an elongated shell being disposed coaxially about a common longitudinal axis, within said apparatus a plate is located in an upstream area of the elongated shell and is integral with the inner wall of the elongated shell and said inner tubular pipe section passes through and is integral with said plate, the plate and converging/diverging tubular section define an outer annular region between the inner wall of the elongated shell and the outer wall of the converging/diverging tubular section, and the inner tubular pipe section of the upstream inlet section and the opening section of the converging/diverging tubular section define an inner annular region, wherein steam from a steam inlet in the elongated shell passes through said outer annular region in a substantially counter-current direction to the flow of the liquid-vapor two-phase mixture until said steam enters said inner annular region and mixes with the liquid-vapor two-phase mixture in a vaporization zone within said converging section of said converging/diverging tubular section prior to exiting the downstream outlet; and
  iii) heating further the liquid-vapor two-phase mixture and steam to provide a substantially completely vaporized hydrocarbon stream or completely vaporized hydrocarbon stream, and then cracking hydrocarbons in said vaporized hydrocarbon stream in a furnace radiant section to obtain a cracked hydrocarbon product.

In still another embodiment, it is an objective of the present invention to provide a simple, compact and economic apparatus that promotes efficient mixing with steam and at least substantially complete or complete vaporization of the heavy hydrocarbon feedstock and reduces or minimizes problems due to coking or fouling. In some embodiments of the invention coking problems are substantially remedied by at least substantially completely vaporizing the heavy hydrocarbon feedstock in the presence of steam prior to cracking in the radiant heating section of a conventional pyrolysis furnace. Substantially complete vaporization is achieved by an apparatus having a unique design, which facilitates efficient vaporization, reduces or minimizes the required length and reduces both capital and operating costs.

At least substantially complete, or complete, vaporization of a hydrocarbon feed mixture with steam is accomplished through the structure and arrangement of the inner section, converging/diverging tubular section, elongated shell, and outlet sections. Although the inventors do not wish to be bound by any theory, it is believed that the relatively narrow inner annular region between the upstream inlet section and the opening to the converging/diverging tubular section increases the entry velocity of the superheated dilution steam. This provides the steam with additional momentum and kinetic energy to maximize vaporization. Still another advantage arises from convergence of the streams within the converging portion of the converging/diverging tubular section. This induces direct impingement of the shrouding stream with the core stream in the vaporization zone and significantly increases the velocity of the mixture. This induces turbulence and a high degree of shear, thereby improving mixing of the steam and hydrocarbon feed.

DETAILED DESCRIPTION OF THE INVENTION

Figure 1:
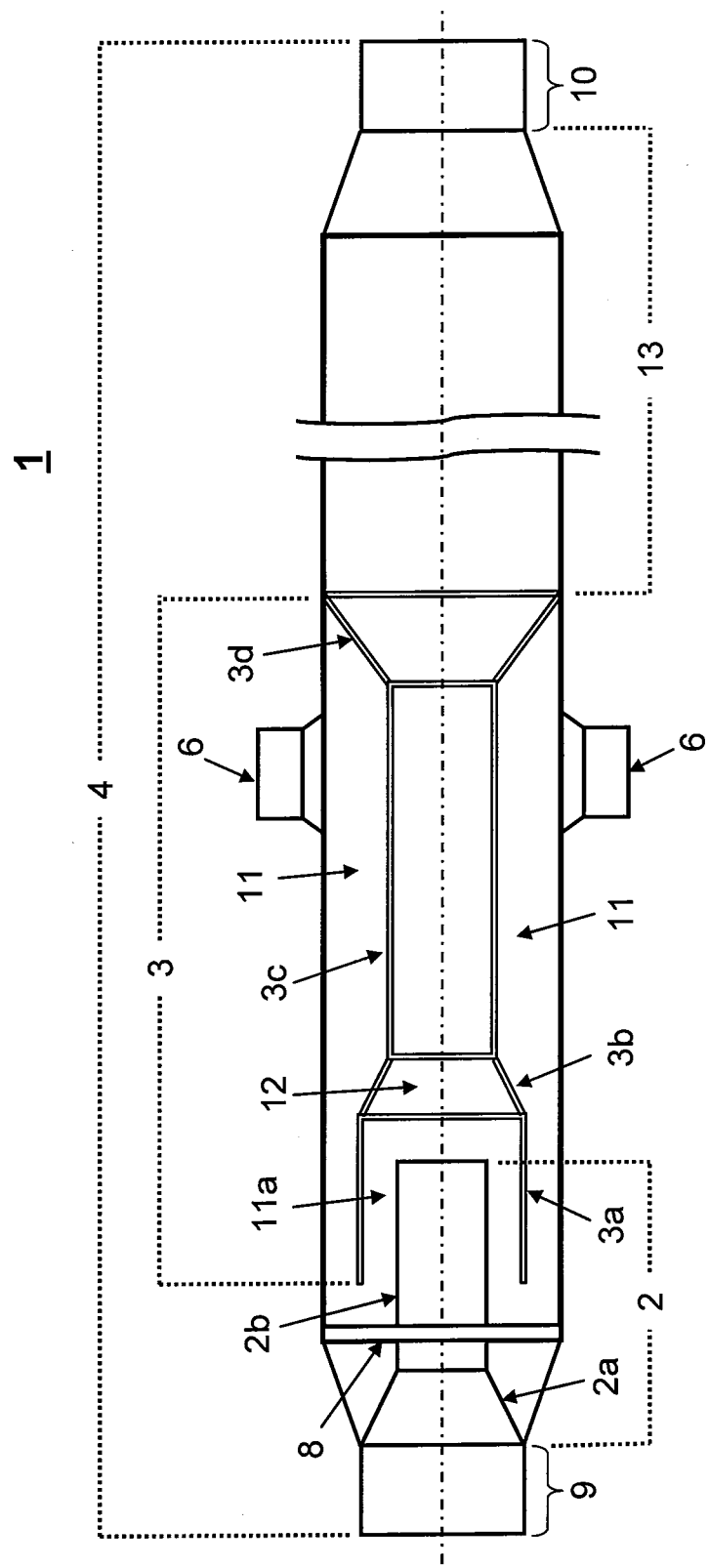
FIG. 1 is a cross-sectional schematic of the heavy feed mixer, which shows the overall shape and arrangement of the upstream inlet section, converging/diverging tubular section, elongated shell and outlet section.

The above and other objectives of the invention will become more apparent from the following description and illustrative embodiments, which are described in detail with reference to the accompanying drawing. Similar elements in each Figure are designated by like reference numerals and, hence, subsequent detailed descriptions thereof are omitted for brevity.

In one embodiment, the present invention relates to an improved heavy feed mixer (1) as presented in FIG. 1. The heavy feed mixer (1) may be located within the convection section of or external to the furnace and in fluid communication with the convection section of a conventional pyrolysis furnace and is designed to accept a mixed two-phase liquid-vapor mixture comprised of hydrocarbon feedstock and dilution steam. After the mixture passes through the heavy feed mixer (1), a substantially fully/completely vaporized stream of hydrocarbon feedstock is output and delivered to the radiant heating section for pyrolytic cracking.

Compared to prior art mixers, the heavy feed mixer (1) significantly shortens the overall mixer length required for complete vaporization of heavy hydrocarbon feedstock. This is accomplished primarily by means of a unique converging/diverging tubular section (3) that includes sections (3a-3d) within the heavy feed mixer (1), as presented in FIG. 1. In describing the novel heavy feed mixer (1) of FIGS. 1-3, the upstream side is shown at the left whereas the downstream side is on the right. In this regard, the flow of hydrocarbon feedstock in FIG. 1, for example, is from left to right. The heavy feed mixer (1) itself is constructed from coaxial tubular sections having coinciding longitudinal axes, i.e., an upstream inlet section (2), a converging/diverging tubular section (3), an elongated shell (4) that includes an upstream inlet (9), an outlet section (13) and downstream outlet (10). The diameter of each tubular section is such that the diameter of down stream portion (i.e., (2b)) of the upstream inlet section (2) is less than the smallest diameter of the converging/diverging tubular section (3) and the diameters of the elongated shell (4) are greater than the largest diameter of the converging/diverging tubular section (3). Although the heavy feed mixer (1) and the sections 2-4 comprising it are described throughout this specification as substantially tubular pipes having circular cross-sections, it is to be understood that the shape and cross-section of the pipes are not so limited. Other shapes which are well-known in the art may be used including, for example, oval, square, rectangular or hexagonal cross-sections.

The tubular sections may be constructed from any material capable of transporting hydrocarbon feedstock and steam while withstanding harsh chemical environments as well as extreme pressures and temperatures. Examples include carbon-containing steel, low alloy steels containing chromium and molybdenum, or stainless steels. Higher operating temperatures and/or more corrosive environments may require more expensive materials such as nickel, titanium and copper alloys. The materials of construction, however, is not critical to the present invention and should not be construed to limit the claims.

The elongated shell (4) including upstream inlet (9), outlet section (13) and downstream outlet (10) are substantially straight with the diverging section (3d) being integral with an inlet of the outlet section (13). The upstream end of the elongated shell (4) comprises an upstream inlet (9) for the introduction of a hydrocarbon feed and dilution steam mixture whereas the downstream end of the outlet section (13) comprises a downstream outlet (10) for directing the vaporized hydrocarbon feedstock from the device to the furnace for superheating and cracking. The elongated shell (4) and outlet section (13) are of sufficient lengths $l_{4o}$ and $l_{13o}$, respectively, to provide substantially completely vaporized heavy hydrocarbon feedstock. The elongated shell (4) is further equipped with at least one steam inlet (6) along its periphery. The steam inlet (6) is positioned downstream of the upstream inlet (9) and is located within the region defining an outer annular region (11) between the converging/diverging tubular section (3) and the elongated shell (4). Steam inlet (6) provides delivery of superheated dilution steam to the outer annular region (11).

The upstream inlet section (2) has an internal length of $l_{2i}$ with a frusto-conical shaped inlet section (2a) in fluid connection with upstream inlet (9) to receive the liquid-vapor two-phase mixture of hydrocarbon feed and dilution steam. The frusto-conical inlet section (2a) extends from upstream inlet (9) to the inner tubular pipe section (2b), such that it is in fluid communication with the inner tubular pipe section (2b) of the upstream inlet section (2). Inner tubular pipe section (2b) extends from frusto-conical shaped inlet section (2a) and passes through a plate (8) that is integral with the interior surface of the elongated shell (4) of the heavy feed mixer (1). The plate (8) is located between the frusto-conical shaped inlet section (2a) and the upstream end of the converging/diverging tubular section (3) so as to confine the upstream end of the outer annular region (11) formed between the elongated shell (4) and the inner tubular pipe section (2b).

The converging/diverging tubular section (3) is situated between the upstream inlet section (2) and the outlet section (13) of the elongated shell (4) and has a diameter which varies along its length in the longitudinal direction. The converging/diverging tubular section (3) is comprised of four distinct subsections: an opening section (3a) which is a straight section of length $l_{3a}$ and a diameter $d_{3a}$ smaller than the diameter $d_{4o}$ of the elongated shell (4), but larger than the diameter $d_{2i}$ of the inner tubular pipe section (2b); a converging section (3b) which provides convergence of the converging/diverging tubular section (3) by gradually reducing the converging/diverging tubular section (3) diameter over a length $l_{3b}$ and convergence angle $\theta_{3b}$; a throat section (3c) having a short and straight length $l_{3c}$ and constant diameter $d_{3c}$ (the converging section (3b) connects the opening section (3a) and throat section (3c)); and a diverging section (3d) that provides a diverging section with a diameter that increases gradually from that of the throat section (3c) $d_{3c}$ to the diameter $d_{4o}$ of the elongated shell (4) over a length $l_{3d}$ and divergence angle $\theta_{3d}$. The diameter $d_{3c}$ of the throat section (3c) is identical to the diameter of the down stream outlet of the converging section (3b). The downstream end of the diverging section (3d) is integral to the interior surface of the elongated shell (4), forming an airtight seal. The combination of the opening section, converging section, throat section and diverging section, i.e., 3a-d, forms the converging/diverging tubular section (3). The converging/diverging tubular section (3), plate (8) and elongated shell (4) provide for the formation of an outer annular region (11). The outer annular region (11) facilitates the introduction of superheated steam into the heavy feed mixer via the steam inlet (6).

Figure 2:
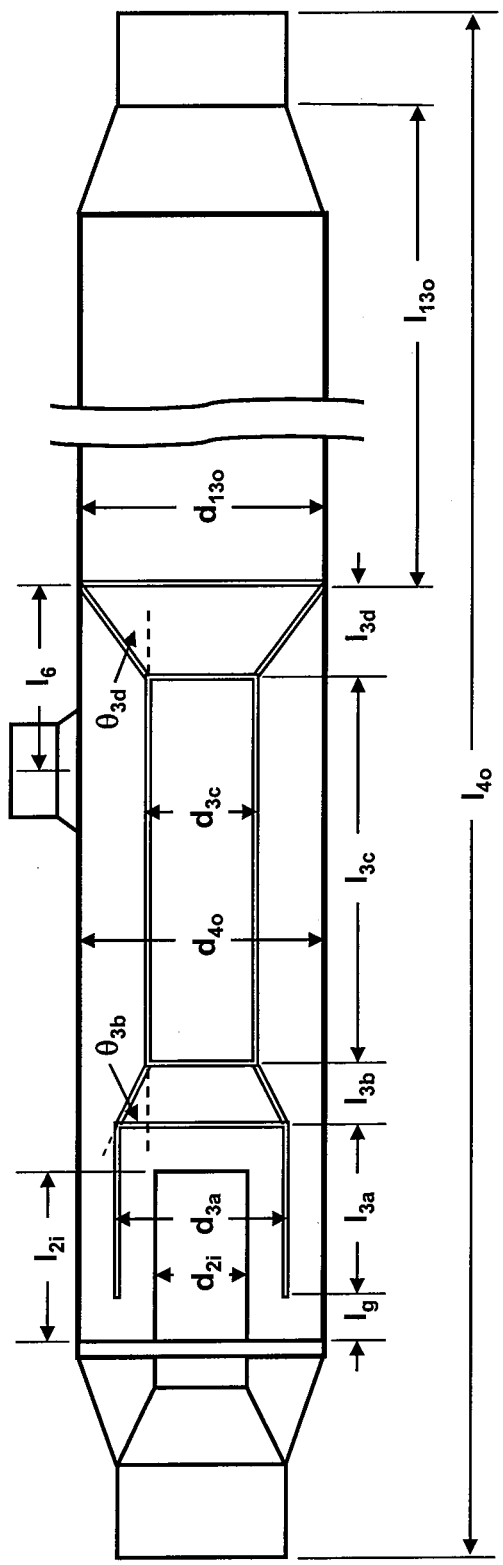
FIG. 2 shows the heavy feed mixer with identifying nomenclature for the dimensions of the upstream inlet section, converging/diverging tubular section, elongated shell and outlet section.
Figure 3:
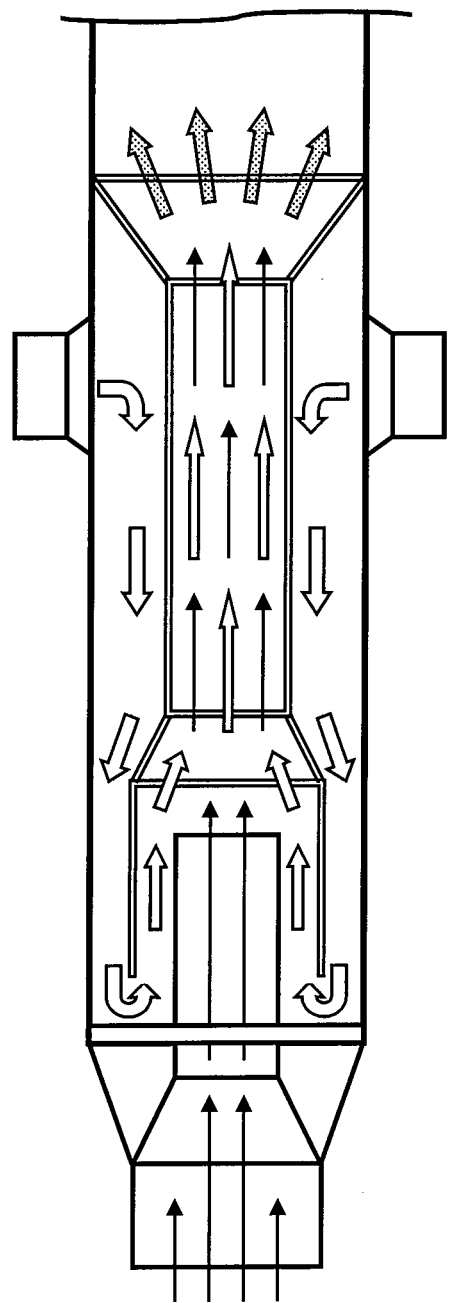
FIG. 3 is a cross-sectional schematic of the heavy feed mixer, which shows the flow of hydrocarbon feed and steam during standard operating conditions.

The purpose of the upstream inlet section (2) is to deliver the two-phase mixture to a vaporization zone (12), which is formed by the converging section (3b) of the converging/diverging tubular section (3). The elongated shell (4) is preferably a straight pipe of length $l_{4o}$ and diameter $d_{4o}$, which is equipped with at least one steam inlet (6) along its periphery for delivery of superheated dilution steam. In FIGS. 1-3, the steam inlets (6) are located near the downstream portion of the throat section (3c) a distance $l_6$ from the position where the diverging section (3d) is integral with elongated shell (4). This facilitates heating of the entire length of the converging/diverging tubular section (3) by steam which is delivered through the steam inlet (6) in a counter-current fashion. Although the steam inlet (6) is shown and described as being upstream of the position where the throat section (3c) meets the diverging section (3d), the outer annular region (11) can be extended further downstream and the steam inlet (6) can be moved closer to the downstream outlet of the heavy feed mixer (1), such that the entire path of the hydrocarbon and dilution steam mixture is heated. Superheated dilution steam entering the heavy feed mixer (1) through the steam inlet (6) initially flows through the outer annular region (11) formed between the elongated shell (4) and converging/diverging tubular section (3) in the upstream or counter-current direction to the hydrocarbon feed entering upstream inlet (9) and as illustrated by the open arrows presented in FIG. 3.

A space or gap of length of $l_g$ is provided between the plate (8) and the start of the converging/diverging tubular section (3). This space provides an area in the heavy feed mixer (1) where the counter current flow of superheated dilution steam from outer annular region (11) takes a 180-degree turn and flows downstream in an inner annular region (11a) between the inner tubular pipe section (2b) and the opening section (3a) of converging/diverging tubular section (3). The gap length $l_g$, where the counter current flow of superheated dilution steam from outer annular region (11) takes a 180-degree turn and flows downstream, length $l_{3a}$ of opening section (3a), and the length of the upstream inlet section (2) are such that the end plane of the opening section (3a) is a short distance downstream from the outlet of the upstream inlet section (2). The gap $l_g$ along with the inner tubular pipe section (2b)/opening section (3a) and opening section (3a)/elongated shell (4) annuli (determined by $d_{3a}-d_{2i}$ and $d_{4o}-d_{3a}$, respectively) are carefully designed and sized to determine the velocity of the entering superheated dilution steam. These dimensions will be further defined with reference to the exemplary embodiment described below. The design and arrangement of the converging/diverging tubular section (3) produces an annular high-velocity shrouding flow of superheated dilution steam around the downstream end of the inner tubular pipe section (2b). Factors in the design of the heavy feed mixer include the size of the inner annular region (11a) and the position of the inner tubular pipe section (2b) with respect to the converging/diverging tubular section (3). The location of each component are chosen so that an even flow of steam is produced around the upstream end of opening section (3a) and downstream end of the inner tubular pipe section (2b).

The two-phase hydrocarbon-steam mixture enters the heavy feed mixer (1) from upstream inlet (9) to the upstream inlet section (2) where it flows out of its downstream end and into the vaporization zone (12), as shown by the solid arrows in FIG. 3. The converging nature of the converging section (3b) of the converging/diverging tubular section (3) guides the superheated dilution steam into the two-phase hydrocarbon-steam mixture exiting the inner tubular pipe section (2b). The impingement of the superheated steam (open arrows) with the hydrocarbon stream (solid arrows) initiates mixing and further vaporization of the liquid hydrocarbon component. The injection half angle $\theta_{3b}$ is defined by the angle formed between the tangent to the wall of the converging section (3b) and the longitudinal axis of the heavy feed mixer (1). The injection half angle $\theta_{3b}$ may be optimized such that the degree of intermixing is a maximum while splashing and the formation of wall deposits is minimized. A larger injection half angle $\theta_{3b}$ puts the intersection between the two mixing streams closer to the outlet of the inner tubular pipe section (2b). This increases the intensity of mixing and vaporization. However, if the injection half angle $\theta_{3b}$ is too large then excessive splashing will occur. This will cause liquid droplets to coalesce and deposit on the pipe walls at an early stage of mixing.

After the two streams intersect in the vaporization zone (12), the hydrocarbon and dilution steam mixture flows through the throat section (3c). The throat section (3c) is where the hydrocarbon and dilution steam mixture attains the highest velocity. Consequently the most intense mixing and vaporization takes place in this section. The increased velocity of the hydrocarbon-steam mixture facilitates complete vaporization and minimizes the quantity of liquid droplets. After traveling through the throat section (3c) at high velocity the mixture exits through the diverging section (3d) as shown by the dotted open arrows in FIG. 3. Within the diverging section (3d), the diameter diverges from that of the throat section (3c) to that of the elongated shell (4) over a divergence angle of $\theta_{3d}$. This divergence in pipe diameter also reduces the number of liquid droplets reaching and depositing on the side walls. In one embodiment the injection half angle $\theta_{3b}$ and divergence angle $\theta_{3d}$ are each at least five degrees. The overall reduction in sidewall deposits occurs primarily due to an increase in both the velocity exiting throat section (3c) and the degree of vaporization of the hydrocarbon-steam mixture produced by the converging/diverging tubular section (3).

Downstream from the integral point between the converging/diverging tubular section (3) and elongated shell (4) (or joint formed between diverging section (3d) and elongated shell (4)), the heavy feed mixer (1) has an outlet section (13), which is a straight section of predetermined length $(l_{13o})$ and diameter $(d_{13o})$. The length is sized to ensure complete vaporization of the liquid phase existing within the mixture. After exiting downstream outlet (10) of the heavy feed mixer (1) the vapor is directed to the furnace convection coils for final heating prior to cracking in the radiant coils.

The overall length $l_{4o}$ of the heavy feed mixer (1) is significantly less than that of conventional heavy feed mixers having the same flow rate capacity. The compact size is due to the unique design of the converging/diverging tubular section (3). One advantage is the counter current flow of superheated steam through the outer annular region (11) formed between the elongated shell (4) and the opening section (3a). The counter current flow of superheated steam through outer annular region (11) makes a 180-degree turn and then continues downstream through the inner annular region (11a) formed between the inner tubular pipe section (2b) and the opening section (3a) to produce a more uniform flow and distribution of superheated steam around the downstream end of the inner tubular pipe section (2b). In this case a long, straight exit tube (e.g., the length from the diverging section exit (3d) to the downstream end of the outlet section (13)) to minimize the flow bias created by the introduction of steam from a side port is not required. Typical side ports, which are well-known in the art, are described and shown, for example, in U.S. Pat. Nos. 6,797,238 and 4,498,629. Another advantage is that the relatively narrow inner annular region (11a) between the inner tubular pipe section (2b) and opening section (3a) increases the entry velocity of the superheated dilution steam. This provides the steam with additional momentum and kinetic energy to maximize vaporization of liquid hydrocarbon in the two-phase mixture. Still another advantage is that convergence of the streams within the converging section (3b) induces direct impingement of the shrouding stream with the core stream in vaporization zone (12), thereby enhancing mixing and vaporization.

The constriction of the flow pattern within the throat of the converging/diverging tubular section (3) produced by convergence to the throat section (3c) significantly increases the velocity of the mixture. This induces turbulence and a high degree of shear, thereby improving mixing of the dilution steam and hydrocarbon feed. Furthermore, the counter current (relative to the hydrocarbon feed from upstream inlet (9)) introduction of superheated steam into outer annular region (11) completely and evenly heats the walls of the converging/diverging tubular section (3). The hot wall of the converging/diverging tubular section (3) aids in hydrocarbon vaporization and reduces deposition of liquid droplets.

The primary component facilitating more efficient mixing and vaporization of heavy hydrocarbon feedstock is the unique converging/diverging tubular section (3) and its placement relative to the inner tubular pipe section (2b). Thus, embodiments in which no outer annular region (11) is provided may be envisioned. An example is provided by FIG. 4 which shows a heavy feed mixer (20) analogous to that in FIGS. 1-3. In this embodiment, opening section (3a) is extended in the absence of annular area (11) in an upstream direction and its upstream end is integral with upstream inlet (9). Thus, according to this embodiment of the invention, elongated shell (4) is comprised of upstream inlet (9), converging/diverging tubular section (3), outlet section (13) and downstream outlet (10). Steam inlet(s) (6) are also positioned upstream of vaporization zone (12) on the periphery of opening section (3a). While the exact position of the steam inlet(s) (6) is not crucial, it is preferably some distance upstream of the downstream exit to the inner tubular pipe section (2b).

Figure 4:
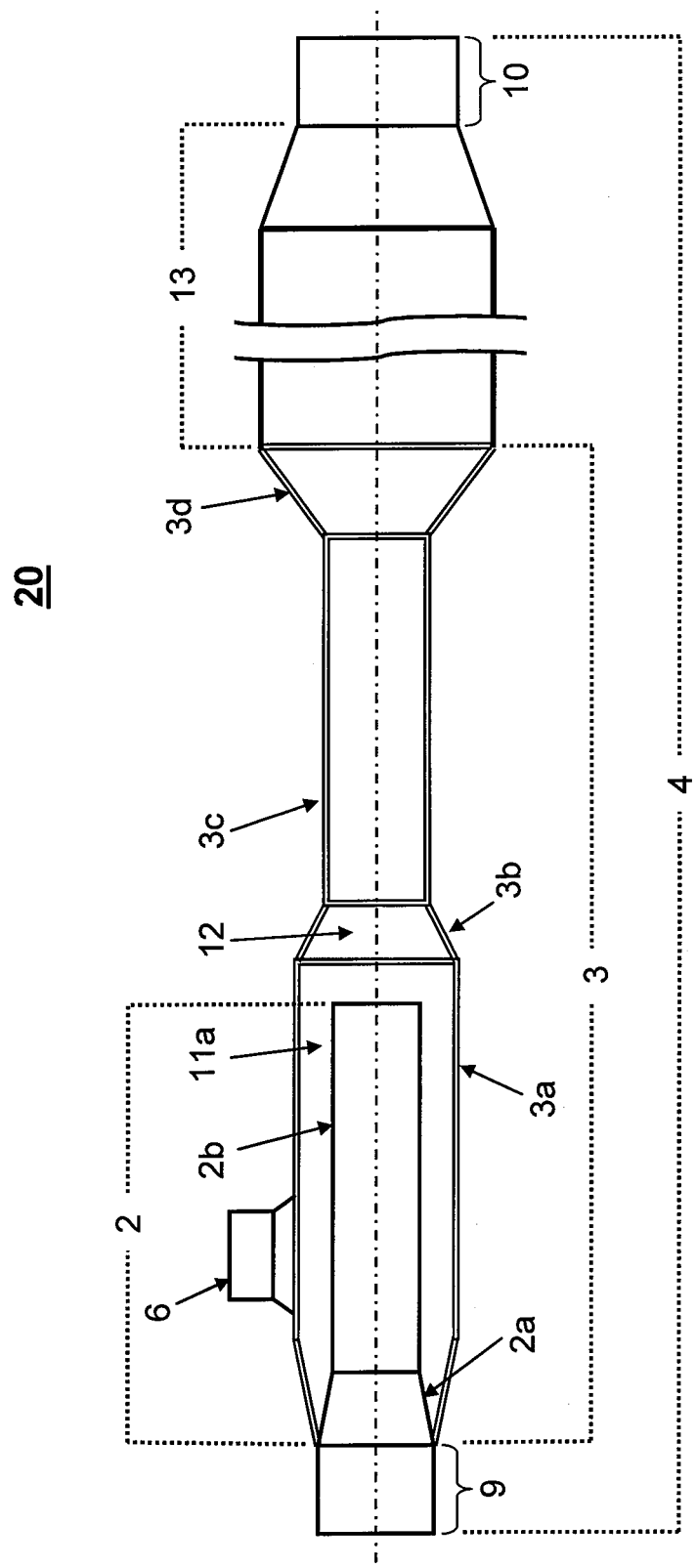
FIG. 4 is a cross-sectional schematic of a second embodiment of the heavy feed mixer, which is not provided with an outer annular region.

When dilution steam is introduced into heavy feed mixer (20) through the steam inlets (6), it travels downstream through the inner annular region (11a) until it reaches the converging section (3b). Here, the shrouding flow of steam impinges upon the hydrocarbon-steam mixture exiting from the inner tubular pipe section (2b) within the vaporization zone (12) to induce further mixing and vaporization of the hydrocarbon feed and steam in a manner analogous to that described with reference to FIGS. 1-3 above. In this embodiment the steam that is introduced through the steam inlets (6) does not make a 180° turn before entering the vaporization zone. As previously noted with respect to the heavy feed mixer (1) in FIGS. 1-3, the size of the inner annular region (11a) and the proximity of the inner tubular pipe section (2b) to the vaporization zone in FIG. 4 are parameters one skilled in the art may configure to produce an even flow of shrouding dilution steam without creating a significant change in the pressure of the shrouding steam and/or hydrocarbon-steam flow.

Conventional heavy liquid feed cracking furnaces require complete vaporization of the hydrocarbon feed prior to cracking in the radiant heating section. Compared to conventional heavy feed mixers, the instant novel design is considerably simpler and smaller. This makes it significantly easier to fit the heavy feed mixer in the congested convection section of a standard pyrolysis furnace. Furthermore, a minimal amount of piping and supporting structures are required, thereby reducing the initial capital investment. In addition to being simpler and more compact, the heavy feed mixer disclosed in this specification is capable of vaporizing heavy hydrocarbon feedstock with a high degree of efficiency. This greatly reduces the risk of coke formation in the convection coils, which leads to still further reductions in overall operating costs.

The heavy feed mixer (1) shown and described with reference to FIGS. 1-3 is designed to fully vaporize a preheated liquid-vapor two-phase mixture of heavy hydrocarbon feedstock and dilution steam. In general, for proper operation, the intake to the heavy feed mixer (1) should be diluted with a predetermined amount of dilution steam and heated to a predetermined temperature, both of which depend upon the type of hydrocarbon used. Furthermore, the range of parameters over which the heavy feed mixer (1) may function according to its intended purpose is dependent on the dimensions and placement of the upstream inlet section (2), converging/diverging tubular section (3), elongated shell (4) and outlet section (13). The exact dimensions of each component of the heavy feed mixer (1) are also dependent upon the type of hydrocarbon feed that is being used. Regardless of the specific dimensions used for the heavy feed mixer (1), the size of the inner annular region (11a) should be such that there is an even flow distribution around the downstream end of the inner tubular pipe section (2b).

The exemplary embodiments of the heavy feed mixer (1) described in this specification are capable of vaporizing heavy feedstock having an initial boiling point of greater than 200° C. Examples of such hydrocarbon feedstocks include, but are not limited to: vacuum gas oil (VGO), heavy gas oil, crude oil, deasphalated oil, oils derived from tar sands and oil shale, gas to liquid heavy ends, heavy condensate and hydrocracked residue. The heavy feed mixer (1) generally has a total length $l_{4o}$ of 5 meters (m), a length scale which is significantly shorter than that for conventional mixers.

A specific application involves the vaporization of VGO. Typical VGO feedstock has a specific gravity of 0.869 and an initial boiling point of 318° C. In this particular example, the overall dilution steam to VGO ratio is 1:1 by weight, but is not so limited. The dilution steam to VGO ratio may range from about 0.5 to about 1.0 and from about 1.1 to about 1. However, a person of ordinary skill in the art will recognize that additional ranges and subranges within the explicit ranges are contemplated and are encompassed within the present disclosure. Furthermore, it is to be understood that these ratios and the subsequent processing parameters that are described below are not limited to VGO, but may also apply to other types of heavy hydrocarbon feedstock. Approximately 20 percent of the total dilution steam used is initially mixed with VGO at the exit of a hydrocarbon preheating coil. This mixture of VGO and dilution steam is heated and the VGO is partially vaporized in the first hydrocarbon and steam heating coil. This two-phase liquid-vapor mixture is then fed to the heavy feed mixer (1) of the present invention. The two-phase mixture enters the mixer (1) through the inner tubular pipe section (2b) and superheated dilution steam is fed into the mixer (1) through the steam inlet (6). The steam is fed from the pyrolysis furnace's dilution steam convection coil and amounts to 80 percent of the total dilution steam used. The output stream (10) from the heavy feed mixer (1) is a mixture comprised of essentially 100 percent vaporized VGO feedstock and dilution steam. The completely vaporized stream of VGO and dilution steam is routed back to the lower convection section and is subsequently fed to the radiant heating section where it undergoes pyrolysis. This produces valuable olefins, such as ethylene and propylene.

It will be appreciated by persons skilled in the art that the present invention is not limited to what has been particularly shown and described hereinabove. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. patents, and U.S. patent Publications cited throughout this specification are hereby incorporated by reference as if fully set forth in this specification.

What is claimed is:

1. An apparatus for the vaporization of a hydrocarbon feed mixture with steam, said apparatus comprises an outer relatively elongated shell comprising a downstream outlet, an outlet section, a converging/diverging tubular section, an upstream inlet section and an upstream inlet,
    (a) said upstream inlet section comprising in fluid communication:
        (i) a frusto-conical inlet section for directing a hydrocarbon feedstock and dilution steam mixture received from the upstream inlet to an inner tubular pipe section, and
        (ii) said inner tubular pipe section for the passage of said hydrocarbon feedstock and dilution steam mixture from said frusto-conical inlet section through a plate separating the frusto-conical inlet section from the converging/diverging tubular section, said upstream inlet and said upstream inlet section are located at an upstream end of said apparatus;
    (b) said converging/diverging tubular section comprising
        (i) an opening section, a converging section, a throat section, and a diverging section, the walls of said diverging section extending to connect to said elongated shell,
        (ii) at least one steam inlet for receiving steam from an opening disposed along said elongated shell into an outer annular region defined by said plate on the upstream end, said elongated shell, and said diverging section on the downstream end,
        (iii) wherein said opening section forms an inner annular region around said inner tubular pipe section for receiving steam from said outer annular region and said hydrocarbon feedstock and dilution steam mixture from said inner tubular pipe section and discharges the mixture into the converging section,
        (iv) wherein said throat section receives the effluent from the converging section, and
        (v) wherein said diverging section receives the effluent from the throat section; and
    (c) said outlet section in fluid communication with the diverging section of said converging/diverging tubular section, said outlet section is in fluid communication with said downstream outlet at a downstream end of the apparatus.

2. The apparatus of claim 1, wherein the steam inlet is located along the length of the converging/diverging tubular section between the plate and the down stream end of the diverging section.

3. The apparatus of claim 1, wherein a tangent to a surface of the converging section forms an angle of at least 5 degrees with respect to a longitudinal axis of the apparatus.

4. The apparatus of claim 1, wherein a tangent to a surface of the diverging section forms an angle of at least 5 degrees with respect to a longitudinal axis of the apparatus.

5. The apparatus of claim 1, wherein the plate is integral with an outer surface of the inner tubular pipe section and an inner surface of the elongated shell.

6. The apparatus of claim 5, wherein the plate is positioned between the frusto-conical inlet section and the upstream end of the opening section of the converging/diverging tubular section.

7. The apparatus of claim 1, wherein a diameter of the inner tubular pipe section is smaller than a diameter of the elongated shell and a smallest diameter of the converging/diverging tubular section.

8. The apparatus of claim 1, wherein a diameter of the opening section is greater than a diameter of the throat section, but less than a diameter of the elongated shell.

9. The apparatus of claim 1, wherein a diameter of the inner tubular pipe section is less than a diameter of the opening section.

* * * * *